July 28, 1970   C. P. BRITTAIN   3,522,355
INDUCTION HEATING ARRANGEMENTS

Filed Oct. 16, 1967   2 Sheets-Sheet 1

United States Patent Office 3,522,355
Patented July 28, 1970

3,522,355
INDUCTION HEATING ARRANGEMENTS
Charles Peter Brittain, Whittington, near Lichfield, England, assignor to Associated Electrical Industries Limited, London, England
Filed Oct. 16, 1967, Ser. No. 675,674
Claims priority, application Great Britain, Oct. 19, 1966, 46,690/66
Int. Cl. H05b 5/14, 9/02
U.S. Cl. 13—29                                       5 Claims

ABSTRACT OF THE DISCLOSURE

An induction heating arrangement for ladles or other refractory vessels comprising an annular core mounted in an upright position and generally having a vertical disposed limb or other member which is capable of movement to one side, so as to provide an opening through which part of a duct, preferably of U-shape, can pass so as to thread the core and provide inductive coupling. There are also two horizontally disposed members of the core, in preference, which may be moved with a vertically disposed limb. In this case the three limbs may be mounted on a trolley arranged to run on rails.

BACKGROUND OF THE INVENTION

This invention relates to induction heating arrangements suitable for heating refractory vessels such as crucibles, ladles or troughs for use in or as furnaces capable of melting a metal charge and/or maintaining the charge in a molten condition.

Such a refractory vessel generally comprises a main body portion capable of holding the main part of the charge and may include a pouring spout or lip which is at an upper end of the vessel when the vessel is in a first normal upright position permitting no discharge of melt. The melt is discharged through the spout or over the lip when the vessel is tilted into a second position. Alternatively the molten metal may be discharged from the base of the melt by unplugging a suitable tap hole provided in a lower part of the vessel.

In such a vessel it is essential to maintain the melt at a substantially constant temperature if discharge of the melt is to occur over a prolonged period, for example during controlled pouring of the melt into a plurality of casting moulds. In order to supply sufficient heat to the melt to maintain it at the desired temperature, the vessel is provided with an extended portion which includes a substantially U-shaped duct having its opposite ends communicating with the inside of the body portion respectively at two spaced apart regions. When the vessel contains a molten metal charge, the metal in the duct and in the body portion forms a closed electrically conductive turn. Refractory vessels provided with a duct of this nature will hereinafter be referred to as the kind specified. An induction heating arrangement including an electric winding inductively coupled to the metal in the duct effects induction heating of the metal in the duct and thereby of the metal in the remainder of the vessel, when suitably energised.

An object of this invention is to provide an induction heating arrangement suitable for effecting induction heating of a refractory vessel of the kind specified, which allows the induction heating arrangement and the vessel to be rapidly separated from each other.

SUMMARY OF THE INVENTION

According to the present invention an induction heating arrangement suitable for inductively heating metal in a refractory vessel of the kind specified, comprises an annular magnetic core provided with a winding and having a portion displaceable to provide a gap in the annulus through which a part of the U-shaped duct on the vessel can pass into the annulus, the said portion of the annulus being replaceable to close the gap so that the duct threads the core.

The displaceable portion of the annular core may be hinged or pivotally mounted so that it can be pivoted or swung aside to allow the duct to pass through the gap, or can be completely detachable, in which case the portion may be adapted for mounting on the duct or other part of the vessel or its supporting platform, so that locating the duct inside the core also locates the portion on the core in a position in which it closes the gap.

The heating arangement can be provided with guide means arranged to co-operate with the refractory vessel or the duct so that the duct can pass through the gap and can be located within the annulus without damage to the winding and the core. Preferably the guide means has a relatively wide entrance portion which permits the vessel to be brought towards its final position on the heating arrangement by a crane without requiring precise manipulation and control, and has a further portion which progressively confines the movements of the vessel to within close limits until the vessel is accurately located with the duct within the annulus.

BRIEF DESCRIPTION OF THE DRAWINGS

The invention will now be described, by way of example with reference to the accompanying drawings in which.

DESCRIPTION OF THE PREFERRED EMBODIMENTS

Figure 1:
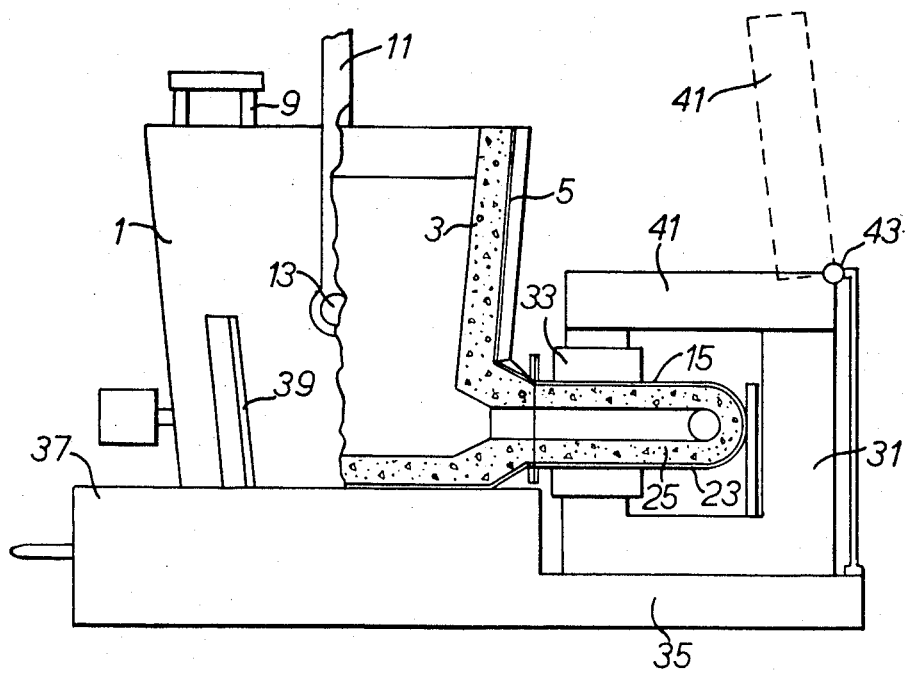
FIG. 1 is a side elevation, partly in section, of a bottom pouring ladle, equipped with induction heating means in accordance with the invention.
Figure 2:
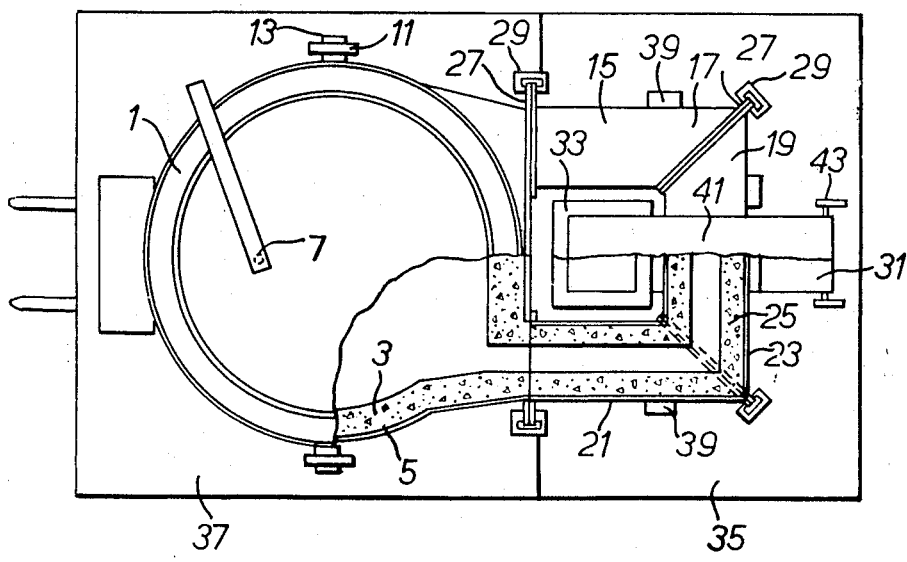
FIG. 2 is a plan view of the bottom pouring ladle and induction heating means shown in FIG. 1.

Referring in the first instance to FIGS. 1 and 2 of the drawings, the bottom pouring ladle includes a substantially cylindrical crucible 1 comprising a refractory lining 3 within an outer supporting metal casing 5. An outlet orifice 7 is provided in the bottom of the crucible and a suitably actuated rod 9 of refractory material is arranged to make sealing contact with the orifice, to seal the orifice and, when partially withdrawn to permit the control of the discharge therethrough of molten metal. The ladle is supported by a carrying yoke 11 pivotally secured to stub shaft 13 secured to diametrically opposite parts of the outer casing 5. A substantially U-shaped duct 15 having a refractory wall extends from the base of the crucible 1 and has its two ends communicating with the inside of the crucible respectively at two regions spaced apart horizontally. The duct 15 is formed by three separate parts 17, 19 and 21, each comprising an outer sheath of non-magnetic metal tube 23 and a refractory lining 25. The adjacent co-operating ends of the parts 17, 19 and 21 are mitred, so that the end faces of the linings 25 and the tubes 23 can firmly abut one another to ensure that no leakage of molten metal can occur from the duct 15 at the joints between the parts. The ends of the tubes 23 have outwardly extending flanges such as flanges 27 to enable these parts to be secured to one another and to the crucible 1. The flanges 27 are held together by quickly detachable clamps 29.

The induction heating arrangement comprises an annular magnetic core 31 which surrounds one limb of the duct 15 formed by the part 19 and is over-wound by a winding 33 connectible to a suitable alternating current source. The core 31 is mounted on a base 35 which includes a platform 37 on which the ladle can stand with the duct 15 within the core 31, the ladle and duct being located relative to the core by guide members 39. The upper horizontally disposed limb 41 of the core 31 is mounted on pivots 43 so that the limb 41 can be swung to the position indicated in broken line, thus providing a gap in the annular core through which the duct can pass when the ladle is raised from or lowered into its position on the platform 37.

In use of the induction heating arrangement the core 31 with its winding 33 connected to a suitable alternating current source forms a station to which a plurality of ladles can be brought in turn to have their contents heated. The guide members 39 ensure that each ladle is correctly positioned on the platform 37 with its duct 15 within the annular core 31. Degassing and other metallurgical treatments can be carried out at the station, the temperature of the metal is maintained at a required value by suitable adjustment of the level of excitation of the winding. To compensate for heat losses while dispensing the molten metal, the contents of the ladle may be superheated at the station. For degassing the ladle may be fitted with a gas tight lid and the duct 15 made gas tight. Alternatively the whole station may be enclosed in a gas tight chamber.

Figure 3:
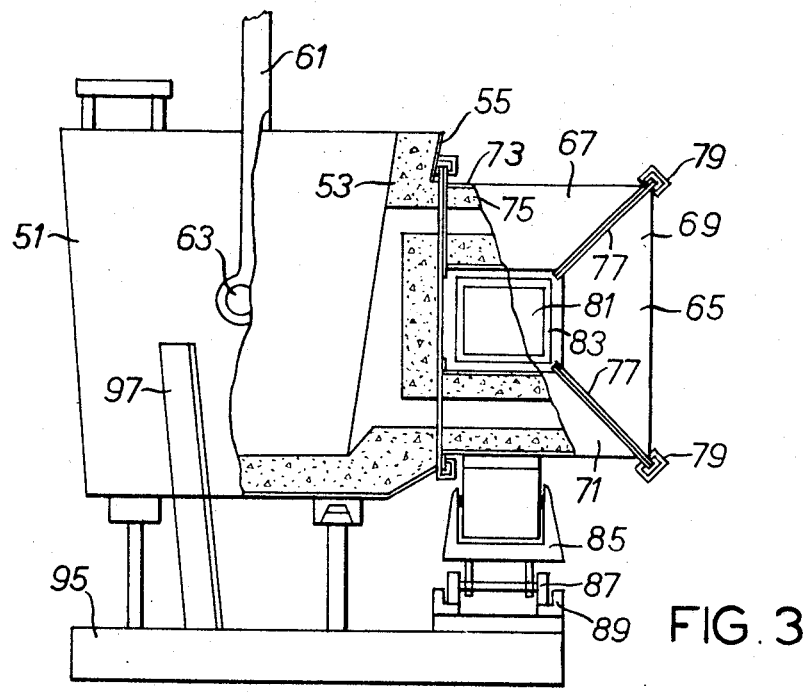
FIG. 3 is a side elevation, partly in section, of another bottom pouring ladle equipped with induction heating means in accordance with the invention.
Figure 4:
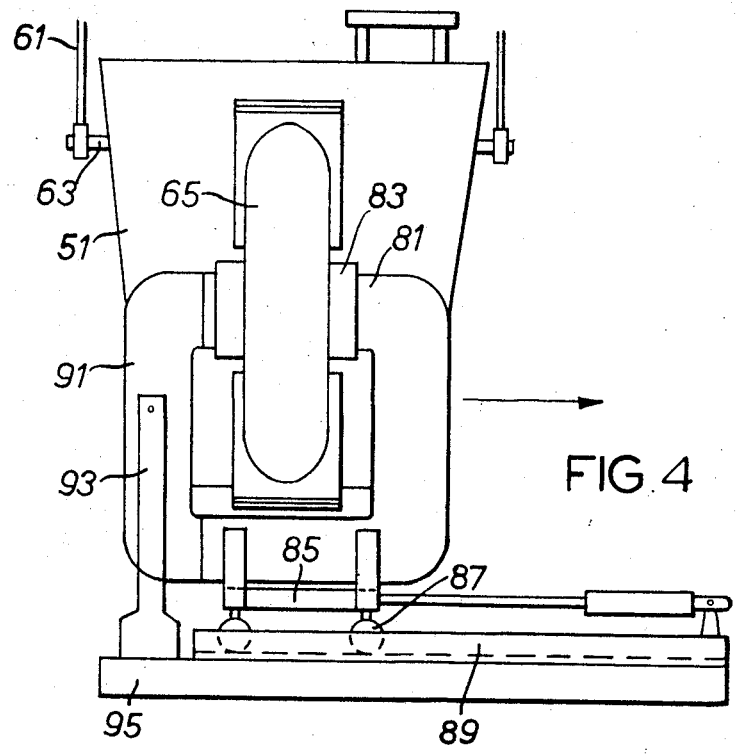
FIG. 4 is an end elevation of the bottom pouring ladle and induction heating means shown in FIG. 3.

Referring now to FIGS. 3 and 4, the bottom pouring ladle includes a substantially cylindrical crucible 51 comprising a refractory lining 53 within an outer supporting metal casing 55. The ladle is supported by a carrying yoke 61 secured to stub shafts 63 secured to diametrically opposite parts of the outer casing 55. A substantially U-shaped duct 65 having a refractory wall extends from one side of the crucible 51 and has its two ends communicating with the inside of the crucible at two regions spaced apart vertically. The duct 65 is formed by three separate parts 67, 69 and 71, each comprising an outer sheath of non-magnetic metal tube 73 and a refractory lining 75. The adjacent co-operating ends of the parts 67, 69 and 71 are mitred, so that the end faces of the linings 75 and the tubes 73 can firmly abut one another to ensure that no leakage of molten metal can occur from the duct 65 at the joints between the parts. The ends of the tubes 73 have outwardly extending flanges such as flanges 77 to enable these parts to be secured to one another and to the crucible 51. The flanges 77 are held together by quickly detachable clamps 79.

The induction heating arrangement comprises an annular magnetic core 81 which surrounds the limb of the duct 65 formed by the part 71 and is overwound by a winding 83 connectible to a suitable alternating current source. Part of the core 81 including the two horizontally disposed limbs and one vertically disposed limb is mounted on a trolley 85 which has wheels 87 arranged to run on rails 89. The other vertically disposed limb 91 of the core which is detachable from the remainder, is supported on a flexible mounting 93 so that the trolley 85 can be moved laterally with the remainder of the core in the direction indicated by the arrow, thus providing a gap between the limb 91 and the remainder of the core through which the duct 65 can pass when the ladle is raised from or lowered into its position on a platform 95. The ladle is located on the platform 95 relative to the core 81 so that the duct 65 threads the core by means of guide members 97.

In use of the induction heating arrangement shown in FIGS. 3 and 4 the core 81 with its winding 83 connected to a suitable alternating current source forms a station to which a plurality of ladles can be brought in turn to have their contents heated. The trolley 85 with the part of the core mounted on it is moved away from the vertically disposed limb 91 so that a ladle can be lowered into position on the platform 95 with the lower part 71 of its duct 65 opposite the window in the separated parts of the core. The trolley is then moved back to its original position as shown in FIG. 3 so that the two horizontally disposed limbs of the core firmly engage the vertically disposed limb 91, with the duct 65 threading the core. The resilience of the mounting 93 ensures that the vertically disposed limb 91 is firmly pressed against the remainder of the core 81.

An advantage of the induction heating arrangements of the invention is that the relatively heavy core and its winding no longer form part of the ladle assembly which can therefore be moved from one location to another more easily. Moreover, the problem of providing electrical connections for supplying energising current to a movable ladle is eliminated. The guide members ensure that a ladle can be lowered into position without risk of damage to the core or its winding.

I claim:
1. An arrangement for inductively heating metal comprising: a refractory vessel; a duct having its opposite ends communicating with the interior of the vessel at two spaced apart regions; an annular magnetic core mounted in an upright position with two portions disposed vertically and two portions disposed horizontally; an energizing winding provided on the core; a vertically disposed portion of the core arranged to be displaced to provide a gap in the annulus through which a part of the duct can pass into the annulus; and means whereby the vertically disposed portion is replaceable to close the gap so that the duct threads the core.

2. An induction heating arrangement as claimed in claim 1, wherein the duct is U-shaped and communicates with the interior of the vessel at two regions spaced apart vertically.

3. An induction heating arrangement as claimed in claim 1, wherein a vertically disposed portion of the annular core is maintained stationary and the remainder of the core comprising a vertically disposed portion and two horizontally disposed portions is movable laterally to provide the gap through which the part of the duct can pass.

4. An induction heating arrangement as claimed in claim 3, wherein the said remainder of the core is mounted on trolley means arranged to run on rails so that the remainder of the core can be moved laterally to provide the gap.

5. An induction heating arrangement as claimed in claim 1, including a platform provided with guide members arranged to receive and locate the refractory vessel so that the duct on the vessel can pass through the gap to thread the core.

References Cited

UNITED STATES PATENTS

| 1,234,280 | 7/1917 | Burnett et al. | 219—10.67 |
| 3,249,676 | 5/1966 | Rydinger et al. | 13—30 X |
| 3,334,171 | 8/1967 | Fredrikson et al. | 13—29 |

JOSEPH V. TRUHE, Primary Examiner

L. H. BENDER, Assistant Examiner

U.S. Cl. X.R.

219—10.79